(12) United States Patent
Abuammah

(10) Patent No.: US 12,467,067 B2
(45) Date of Patent: Nov. 11, 2025

(54) CELL TRANSFECTION

(71) Applicant: Aliah Mohammed Abuammah, Riyadh (SA)

(72) Inventor: Aliah Mohammed Abuammah, Riyadh (SA)

(*) Notice: Subject to any disclaimer, the term of this patent is extended or adjusted under 35 U.S.C. 154(b) by 1080 days.

(21) Appl. No.: 17/432,405

(22) PCT Filed: Feb. 20, 2020

(86) PCT No.: PCT/GB2020/050406
§ 371 (c)(1),
(2) Date: Aug. 19, 2021

(87) PCT Pub. No.: WO2020/169979
PCT Pub. Date: Aug. 27, 2020

(65) Prior Publication Data
US 2022/0186262 A1    Jun. 16, 2022

(30) Foreign Application Priority Data

Feb. 20, 2019   (SA) .................................. 119400475
Feb. 20, 2019   (SA) .................................. 119400476
Feb. 20, 2019   (SA) .................................. 119400477

(51) Int. Cl.
| | | |
|---|---|---|
| C12N 9/22 | (2006.01) | |
| C12N 15/11 | (2006.01) | |
| C12N 15/113 | (2010.01) | |
| C12N 15/90 | (2006.01) | |

(52) U.S. Cl.
CPC ............. *C12N 15/907* (2013.01); *C12N 9/22* (2013.01); *C12N 15/11* (2013.01); *C12N 15/113* (2013.01); *C12N 2310/14* (2013.01); *C12N 2310/20* (2017.05); *C12N 2533/52* (2013.01); *C12N 2800/80* (2013.01)

(58) Field of Classification Search
CPC .......................... C12N 15/111; C12N 2310/20
See application file for complete search history.

(56) References Cited

U.S. PATENT DOCUMENTS

| | | |
|---|---|---|
| 2006/0088834 A1 | 4/2006 | Bain et al. |
| 2007/0054266 A1 | 3/2007 | Sato et al. |

OTHER PUBLICATIONS

Pasternack RM, Rivillon Amy S, Chabal YJ. Attachment of 3-(Aminopropyl)triethoxysilane on silicon oxide surfaces: dependence on solution temperature. Langmuir. Nov. 18, 2008;24(22):12963-71. doi: 10.1021/la8024827. Epub Oct. 23, 2008. PMID: 18942864. (Year: 2008).*

Su KC, Tsang MJ, Emans N, Cheeseman IM. CRISPR/Cas9-based gene targeting using synthetic guide RNAs enables robust cell biological analyses. Mol Biol Cell. Oct. 1, 2018;29(20):2370-2377. doi: 10.1091/mbc.E18-04-0214. Epub Aug. 9, 2018. PMID: 30091644; PMCID: PMC6233062. (Year: 2018).*

Nataly Maimari et al: "Towards an integrated platform for gene network inference and validation", Doctor of Philosophy, Department of Bioengineering, Imperial College London, Feb. 1, 2016 (Feb. 1, 2016), pp. 1-247.

Mannherz O et al: "Functional screening for proapoptotic genes by reverse transfection cell array technology", Genomics, Academic Press, San Diego, US, vol. 87, No. 5, May 1, 2006 (May 1, 2006), pp. 665-672.

Uchimura et al: "Reverse transfection using antibodies against a cell surface antigen in mammalian adherent cell lines", Journal of Bioscience and Bioengineering, Elsevier, Amsterdam, NL, vol. 104, No. 2, Aug. 1, 2007 (Aug. 1, 2007), pp. 152-155.

Kim Hi Chul et al: "Development of a cell-defined siRNA microarray for analysis of gene function in human bone marrow stromal cells", Stem Cell Research, Elsevier, NL, vol. 16, No. 2, Feb. 10, 2016 (Feb. 10, 2016), pp. 365-376.

* cited by examiner

*Primary Examiner* — Fereydoun G Sajjadi
*Assistant Examiner* — Qinhua Gu
(74) *Attorney, Agent, or Firm* — John S. Sears; Lex Generalis, LLC

(57) ABSTRACT

A method of preparing a slide for use in the transfection of cells is disclosed. The method comprises the steps of a) providing a biological material composition having a temperature of from 15 to 25° C.; b) providing the slide having a temperature of from 26 to 50° C.; and c) depositing the biological material composition onto a surface of the slide, to at least partially adhere the biological material composition to the slide. The biological material composition material composition may comprise siRNA or gRNA, for example. The method may provide an improved adherence of the biological material to the slide and subsequently facilitate transfection of cells on the slide. A slide produced by the method, a composition for applying to the slide and a method of transfecting a cell are also disclosed.

11 Claims, 9 Drawing Sheets

CELL TRANSFECTION

CROSS-REFERENCE TO RELATED APPLICATIONS

This application is a National Phase Application of International Application No. PCT/GB2020/050406, filed Feb. 20, 2020, which claims the benefit of Kingdom of Saudi Arabia patent application numbers 119400475, 119400476, and 119400477, each filed on Feb. 20, 2019, which applications are incorporated herein fully by this reference.

FIELD

The present invention relates to a method of preparing a surface for use in cell transfection, to a slide comprising such a surface, to a composition for use in cell transfection and to a method of cell transfection. In particular the present invention relates to improvements in the adherence of biological compositions to slides and to additives in said biological compositions, both of which may improve a subsequent cell transfection method, for example by improving the cell transfection efficiency.

BACKGROUND

Since the advent of genomic sequencing many techniques have been utilised to help identify the function of individual genes in cellular signalling pathways and cell function. Significant progress has been made in this area with the introduction of high-throughput forward genetic screens utilising RNAi technology to investigate the function of genes of interest. The limitations in RNAi technology have led to the development of new techniques such as CRISPR-Cas9 genome editing. There are many advantages associated with CRISPR-Cas9 that are improvements over more traditional RNAi techniques such as the increase in specificity and full inhibition or knockdown of the gene of interest. Both techniques are reliant on several laboratory procedures that enable the high-throughput analysis and screening of a large number of cells with potentially altered genetic phenotypes.

One such technique that is used to introduce genetic material into a cell is transfection. Low-throughput transfection may be carried out manually, however the large number of cells that need to be screened in order to carry out RNAi and/or CRISPR-Cas9 genome editing necessitate a method that is high-throughput and may be assisted by liquid handling and robotics. To this end, reverse transfection is a technique that has been employed previously. In this technique the genetic material that is to be introduced into the cell is printed onto a solid surface with an agent that facilitates transfection and the cells are seeded on top of this. For reverse transfection to be effective, the genetic material needs to remain attached to the slide so that cell attachment and transfection can occur. To date, an acceptable solution to ensure that genetic material remains in situ has not been developed.

The phenomenon of particles suspended in liquid subsequently captured by a solid surface is referred to as particle deposition. The deposition of colloidal particles on various surfaces is of great importance in industry, medicine, agriculture, water filtration, and several other fields. The study of particle deposition is also of interest to the field of colloid science. At small particle-wall interactions, classical theories of colloid stability break down. No adequate theories exist that predict the depth of primary energy minima accurately. Nor is the magnitude known of forces that prevent particles captured in such a minimum to move tangentially along the surface.

SUMMARY OF THE INVENTION

It is one aim of the present invention, amongst others, to provide a method of preparing a slide for transfection of a cell and a method of transfection of a cell that addresses at least one disadvantage of the prior art, whether identified here or elsewhere, or to provide an alternative to existing methods. For instance it may be an aim of the present invention to provide a method which produces a slide on which genetic material which is adhered more firmly than known methods to facilitate subsequent manipulations such as transfection and high throughput screening.

According to aspects of the present invention, there is provided a method, slide and use as set forth in the appended claims. Other features of the invention will be apparent from the dependent claims, and from the description which follows.

According to a first aspect of the present invention, there is provided a method of preparing a surface for deposition of cells, the method comprising the steps of:
   a) providing a biological material composition having a temperature of from 15 to 25° C.;
   b) providing the surface having a temperature of from 26 to 50° C.; and
   c) depositing the biological material composition having a temperature of from 15 to 25° C. onto the surface having a temperature of from 26 to 50° C., to at least partially adhere the biological material composition to the surface.

The surface prepared according to this method is suitable for subsequent deposition of cells, for example in order to transfect said cells. Suitably the prepared surface is for transfection of a cell.

The method of this first aspect involves creating a temperature gradient between the biological material composition and the surface. The inventor has found that such a temperature gradient may provide an improved adherence of the biological material composition to the surface which is advantageous for subsequent operations of transfection of cells deposited onto the biological composition on the surface, and further screening (e.g. high throughput screening (HTS)) and/or analysis of the cells after transfection. The adherence of the biological material composition to the surface has been shown to be strong, stable and effectively irreversible in conditions relevant to transfection and HTS. By carrying out transfection on surfaces prepared from this method, an siRNA or gRNA signal from the transfected cells was maintained for up to 7 days, and the transfected cells were stable and viable for more than 12 days. This is an improvement compared to when similar surfaces prepared using known methods are used.

Thermal effects of temperature and temperature gradient (thermophoresis) on particle deposition are essential but have traditionally been seen with less importance. The majority of prior research into micro-/nanoparticle deposition was conducted at room temperature (~20-25° C.) with little consideration of the elevated bulk temperature or temperature gradient. The inventor has found that this is a crucial factor for thermal driven fouling phenomena.

The inventor has addressed the problem of ensuring genetic material remains in situ to allow reverse transfection and have developed a method whereby genetic material may be at least partially adhered to a solid surface and remains in place long enough to allow a high reverse transfection rate.

The surface prepared in this first aspect is suitable for transfection of cells subsequently deposited onto the biological composition on the surface, the cells contacting the biological material composition and a component of the biological material composition carrying out the transfection.

In step a), the biological material is provided at a temperature of from 15 to 25° C. Suitably the biological material is provided at a temperature of from 15 to 20° C., suitably from 17 to 19° C., suitably approximately 18° C.

In step b), the surface is provided at a temperature of from 26 to 50° C. Suitably the surface is provided at a temperature of from 26 to 40° C., suitably at a temperature of from 30 to 40° C.

Suitably the difference in the temperature of the biological material composition and the surface in step c) is at least 5° C., suitably at least 10° C., suitably at least 15° C.

The method of this first aspect may comprise, after step c), a step d) of drying the surface. Step d) suitably allows any solvent present in the biological material composition to evaporate and/or to allow a bond between the surface and the biological material composition to develop. Step d) may be carried out at a raised temperature, for example a temperature of at least 30° C. Step d) may be carried out in a drying room. Alternatively, step d) may be carried out at ambient temperature. Step d) may be carried out for at least 1 hours and suitably for up to 48 hours.

The surface provided in step b) is any surface suitable for the transfection of cells and subsequent analysis and/or screening which may be carried out on or using said transfected cells. The surface is therefore suitably solid with a flat regular surface suitable for receiving and biological material and incubating live cells. Such surfaces may be formed of a glass or a polymeric material. Suitably the surface has optical properties which facilitate analysis of cells on the surface by known methods, for example involving fluorescence imaging. The surface may be a surface of a slide. Suitably the slide is compatible with standard microscopes enabling performance of automatic screening and high-resolution imaging at a single-cell level. Suitable slides are known in the art.

Suitably the surface is formed from glass, preferably indium tin oxide.

Suitably in step b), the surface is substantially free of impurities and contaminants which may adversely affect the subsequent operations and tests carried out on the surface. Step b) may therefore involve the removal of impurities, for example cleaning and/or washing of the surface.

Suitably the biological material composition comprises a material, suitably a biological material for transfection into the cell in a subsequent transfection step. The biological material may comprise a protein, an antibody, a cell lysate, a fixed tissue or a living cell. Additionally or alternatively the material for transfection into the cell may comprise a small molecule and/or a pharmaceutically active compound.

Suitably the biological material composition comprises genetic material for transfection into a cell. Suitably the biological material composition comprises a nucleic acid. Therefore the biological material composition may be termed a composition comprising a nucleic acid. For example, the biological material composition may comprise RNA or DNA, preferably siRNA or gRNA. In some embodiments, the biological material composition comprises gRNA suitable for CRISPR-Cas9 genome editing. Such gRNA and associated methodology for carrying out CRISPR-Cas9 genome editing which can be applied to the surfaces prepared according this first aspect are known in the art.

Suitably the biological material composition comprises a polymeric material which facilitates the adherence of genetic material to the surface. The polymeric material may be a glycoprotein, suitably fibronectin. Suitably the biological material composition comprises a genetic material and polymeric material, suitably a genetic material and fibronectin.

Suitably the biological material composition comprises a transfection agent which facilitates the transfection of a cell with the genetic material. Therefore the biological material composition suitably comprises genetic material, a polymeric material and a transfection agent. Some suitable transfection agents may be known in the art, such as calcium phosphate, Fugene and Lipofectamine. In some embodiments, the biological material composition comprises (3-aminopropyl)triethoxysilane (APTES) (as the transfection agent). The inventor has surprisingly found that APTES is an effective transfection agent which can transport genetic material into suitable cells and can stabilise genetic material such as RNA at room temperature for 72 hours. APTES also has the advantage of being non-toxic in tests against the human vein lining cells human umbilical vein endothelial cells (HUVEC), human embryonic kidney 293 cells (HEK 293) and human microvascular endothelial cells (HMEC-1). The biological material composition suitably comprises genetic material, a polymeric material and APTES. The biological material composition suitably comprises genetic material, fibronectin and APTES. The biological material composition suitably comprises siRNA or gRNA, fibronectin and APTES.

The inventors have combined the method steps involving creating a temperature gradient between the biological material composition and the surface with an improved biological material composition (or deposition/printing solution) incorporating (3-aminopropyl)triethoxysilane (APTES) as an improved transfection reagent. There are many techniques and reagents that have been used to facilitate transfection of genetic material into cells, such as Lipofectamine and/or electroporation. APTES is frequently used in silanization of solid surfaces. The inventor has surprisingly found that the use of APTES in the present method facilitates transfection.

Suitably the biological material composition comprises from 50 to 70 wt % genetic material, from 5 to 20 wt % of a transfection agent and from 25 to 35 wt % of a polymeric material, based on the total weight of solids in the composition.

Suitably the biological material composition comprises from 50 to 70 wt % genetic material, from 5 to 20 wt % APTES and from 25 to 35 wt % fibronectin, based on the total weight of solids in the composition.

Suitably the biological material composition comprises from 55 to 65 wt % genetic material, from 7 to 15 wt % APTES and from 26 to 32 wt % fibronectin, based on the total weight of solids in the composition.

In some embodiments, the biological material composition consists essentially of genetic material, a polymeric material and APTES. In some embodiments, the biological material composition consists of genetic material, a polymeric material and APTES.

In some embodiments, the biological material composition consists essentially of from 50 to 70 wt % genetic material, from 5 to 20 wt % APTES and from 25 to 35 wt % fibronectin, based on the total weight of solids in the composition. In some embodiments, the biological material composition consists of from 50 to 70 wt % genetic material, from 5 to 20 wt % APTES and from 25 to 35 wt % fibronectin, based on the total weight of solids in the composition.

The biological material composition may be an aqueous solution, for example a solution of the components of the biological material composition in water (suitably distilled water) or in saline. Therefore the biological material composition is suitably an aqueous solution of genetic material, a polymeric material and a transfection agent. Suitably the biological material composition is an aqueous solution of genetic material, a polymeric material and APTES. Suitably the biological material composition is an aqueous solution of genetic material, fibronectin and APTES.

In some embodiments, the biological material composition consists essentially of genetic material, a polymeric material, APTES and water. In some embodiments, the biological material composition consists of genetic material, a polymeric material, APTES and water.

In some embodiments, the biological material composition consists essentially of from 50 to 70 wt % genetic material, from 5 to 20 wt % APTES, from 25 to 35 wt % fibronectin, based on the total weight of solids in the composition, and water. In some embodiments, the biological material composition consists of from 50 to 70 wt % genetic material, from 5 to 20 wt % APTES, from 25 to 35 wt % fibronectin, based on the total weight of solids in the composition, and water.

Suitably step c) involves depositing a droplet of an aqueous solution of the biological material composition. The droplet may have a volume of from 1 to 600 μL.

Suitably step c) involves depositing the biological material composition to form a dot of the biological material composition on the surface. The dot may have a diameter of from 40 to 600 μm.

Suitably step c) involves depositing the biological material composition multiple times to form an array of dots of the biological material composition on the surface. Suitably the dots in the array are sufficiently defined and spaced apart for each dot to be separately treatable with living cells to provide separate colonies of said cells which do not contact or interact with each other. This suitably allows the cells on the dots to be individually analysed or screened using known methods, for example in an HTS method.

Suitably the dots of the biological material composition produced in step c) have uniform intra-dot distribution, uniform inter-dot concentration, regular dot shape and preferential cell attachment on dots.

In such embodiments, the dots of the biological material composition may be considered to be printed on the surface. Known methods for printing such dots may be used herein for carrying out step c).

Suitably the steps of the method of this first aspect are carried out in the order step a) followed by step b) followed by step c), followed by optional step d).

The method as described in the previous embodiment may also be suitable for use in the performance of fluid shear stress methods and experiments.

It will be appreciated by the skilled person that this technique may be of importance in methods not related to reverse transfection. For example, the deposition of compounds for high-throughput compound screening and any technique whereby it is beneficial to print or bind small molecules to a solid surface for any number of applications. Therefore in some embodiments, the method of this first aspect may involve providing a composition comprising a ("non-biological", non-nucleic acid) compound instead of the biological material composition and depositing said composition comprising the compound onto the surface. Such a method may be a method of preparing a surface for an assay, for example.

According to a second aspect of the present invention, there is provided a method of reverse transfection of a cell, the method comprising the steps of:
1) preparing a surface comprising a biological material composition according to the method of the first aspect;
2) depositing live cells onto the biological material composition on the surface; and
3) incubating the live cells on the surface to allow transfection of the cell with the biological material composition to take place.

Step 2) may involve depositing sufficient live cells onto the biological material composition to substantially cover the biological material composition, for example wherein the biological material composition has been deposited as a dot or an array of dots. Excess cells may be washed off the surface, suitably after at least a first period of incubation in step 3).

Step 3) may be carried out for at least 10 minutes, suitably at least 20 minutes, suitably for at least 30 minutes.

Suitably the method comprises, after step 3), a step 4) of adding a dye to the cells. A suitable dye may be a plasma and/or a nuclear dye.

Following the addition of dye to the cells, the cells attached to the solid surface may be imaged to confirm that reverse transfection of the genetic material has taken place. Cells that have been successfully transfected may begin to express a fluorescent marker that may be used as evidence of the successful reverse transfection of genetic material into the cell. Using the methods as described in the first and/or second aspects of the invention the percentage of cells expressing a fluorescent marker may be higher than the percentage observed with alternative methods of surface preparation and reverse transfection. The percentage of cells expressing a fluorescent marker of transfection is otherwise known as the transfection efficiency.

The increased transfection efficiency observed when using the methods of the present invention may be useful in gene-editing and/or genome engineering, for example with RNA interference and CRISPR-Cas9. The increased transfection efficiency may also be useful for high-throughput screening wherein sensitive pathways may be studied individually or to evaluate the crosstalk between cellular signalling pathways.

After the addition of dye to the cells as described above, data may be collected using high-throughput imaging to capture functional and morphometric information from single cells and/or high content analysis to extract and/or understand the multi-parametric data obtained from the high-throughput images.

Using a surface prepared according to the method of the first aspect of the invention may increase the amount of genetic material that is attached to the surface and may lead to an improved transfection efficiency after seeding and reverse transfection of cells on the surface.

According to a third aspect of the present invention, there is provided a method of reverse transfection of a cell, the method comprising the steps of:
1) depositing a biological material composition onto a surface to at least partially adhere the biological material composition to the surface, wherein the biological material composition comprises genetic material, (3-aminopropyl)triethoxysilane and a polymeric material;

2) depositing live cells onto the biological material composition on the surface; and
3) incubating the live cells on the surface to allow transfection of the cell with the biological material composition to take place.

The biological material composition used in step 1) may have any of the suitable features and advantages described above in relation to the first aspect. Suitably the polymeric material is fibronectin.

As described above, the inventor has found that (3-aminopropyl)triethoxysilane (APTES) is an effective and non-toxic transfection agent which can transport genetic material into suitable cells and can stabilise genetic material such as RNA at room temperature for 72 hours.

The method of this third aspect may have any of the suitable features and advantages described herein, particularly in relation to the method of the second aspect.

According to a fourth aspect of the present invention, there is provided a use of (3-aminopropyl)triethoxysilane for reverse transfection of a cell with genetic material.

The use of this fourth aspect may have any of the suitable features and advantages described in relation to the first, second and third aspects.

Suitably the genetic material is RNA, suitably siRNA or gRNA.

According to a fifth aspect of the present invention, there is provided a slide for transfection of a cell, the slide comprising a biological material composition comprising genetic material, (3-aminopropyl)triethoxysilane and a polymeric material.

The slide, biological material composition, genetic material, (3-aminopropyl)triethoxysilane and a polymeric material may have any of the suitable features and advantages described in relation to the first aspect.

According to a sixth aspect of the present invention, there is provided a composition comprising genetic material, APTES and a polymeric material.

The composition of this sixth aspect may have any of the suitable features and advantages of the biological material composition described in relation to the first aspect.

Suitably the genetic material comprises a nucleic acid. Suitably the composition of this sixth aspect comprises siRNA or gRNA, APTES and fibronectin.

BRIEF DESCRIPTION OF THE DRAWINGS

For a better understanding of the invention, and to show how example embodiments may be carried into effect, reference will now be made to the accompanying drawings in which.

EXAMPLE 1

Thermophoresis and Particle Deposition

Figure 1:
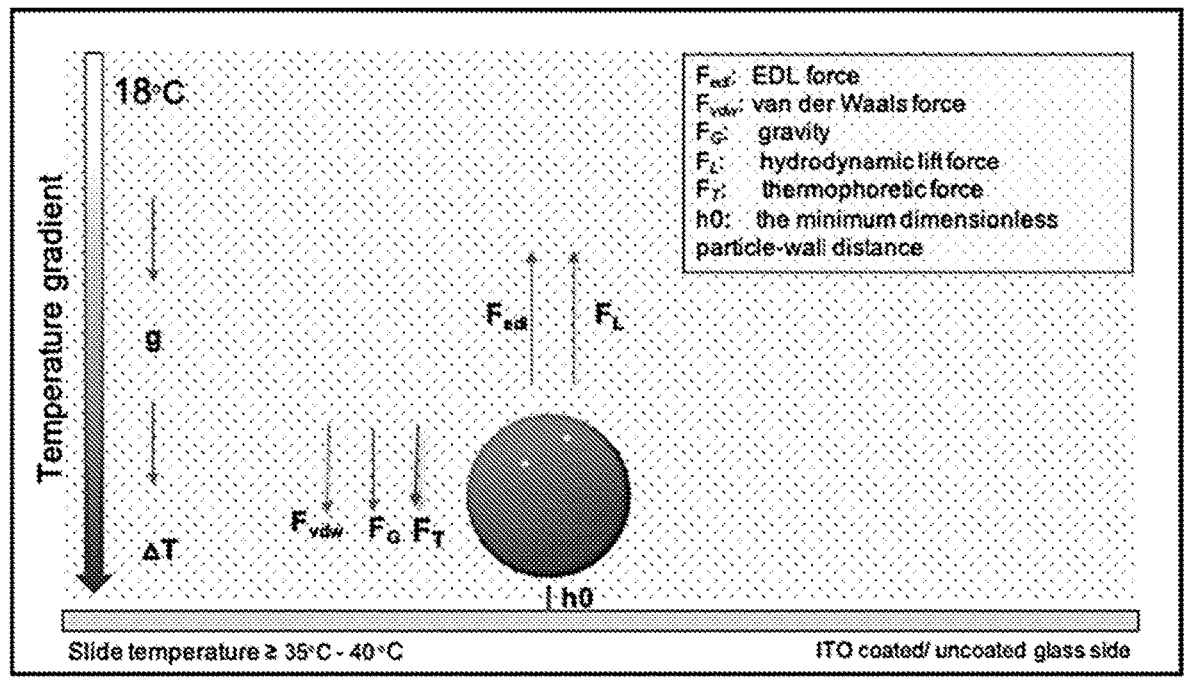
FIG. 1 is a schematic diagram describing micro/nanoparticle deposition. The forces on the particle are van der Waals force (Fvdw), gravity force (FG), electric double layer force (Fedl), thermophoretic force (FT), and hydrodynamic lift force (FL). The minimum separation distance between the particle surface and the bottom surface h0, and the applied temperature gradient T (the diagram is not drawn to scale).
Figure 2:
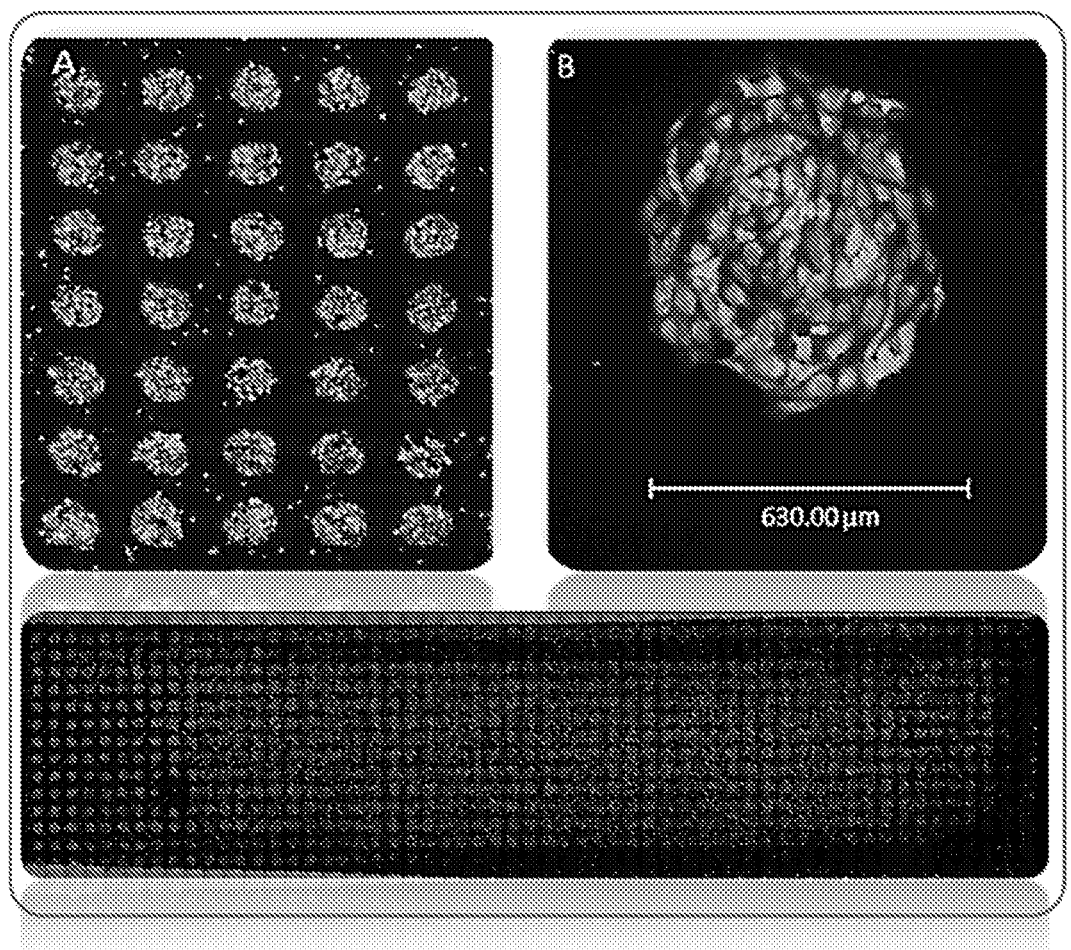
FIG. 2 is a stitched image of a tile scan microscope image using Zeiss Axiovert 200 inverted widefield fluorescent microscope in GFP channel at 10× objective of an ITO slide printed with 840 siRNA spots and seeded with copGFP HUVECs on the first day. A: Tile scan of spots. B: A random spot.

In this experiment, a difference between the temperature of the printing solution and the temperature of the collecting surface, where the surface is hotter, increased the deposition of particles on the surface. The deposition of the particles on the surface was found to be strong, stable and irreversible.

The temperature difference between the printing solution and the collecting surface was created by cooling the print solution comprising genetic material (73%) and fibronectin (27%) by incubating in the at 18° C. with a hot cover of 105° C. for 20 minutes. The slides (collecting surface) were warmed by oxygen plasma treatment with the following settings: 200 W, Ambers 2.5 for 5 minutes for ITO coated glass slides and 180 W for 5 minutes for the slide. The slides were subsequently directly printed with the printing solution. The slides were allowed to dry for at least 1 hour up to maximum of 48 hours in a closed drying room prior to seeding with cells.

Evaluation of the Accuracy and Reproducibility of the Current Platform

The combination of oxygen plasma surface treatment, and printing with a solution comprising APTES, fibronectin and siRNA/gRNA was evaluated. The array was found to be of uniform circular siRNA spots with sufficient siRNA/gRNA retention to enable reverse transfection.

ITO Slides Preparation

ITO slides are glass charged and transparent which make them easy to be imaged by microscopy. However, the slides need to be functionalised to immobilize the RNA spots to allow the printing of spots on glass or ITO. All sonication steps were carried out using an ultrasonic bath set to 40° C.
1. Sonicate the slides with 5% of an alkaline special glass cleaning concentrate (Hellmanex) for 2 minutes
2. Rinse under flowing absolute pure water (18.2 MΩ at 25° C.) for 2 minutes
3. Sonicate with absolute pure water (18.2 MΩ at 25° C.) for 5 minutes twice
4. Sonicate with Acetone for 8 minutes
5. Sonicate with Isopropanol for 8 minutes Protocol
6. Wash with absolute pure water (18.2 MΩ at 25° C.) five times
7. Sonicate with absolute pure water (18.2 MΩ at 25° C.) for 8-10 minutes
8. Dry the slide under a nitrogen or argon stream
9. Slides were then kept in a sealed container until they were treated with oxygen plasma prior to printing.

O2 Plasma Treatment

The slides should be kept in a closed histology box until the O2 plasma treatment (same day just before printing)
1. Wash with O2 plasma for three times
2. Treat with the following setting: 180 W plasma power, pressure 0.2 mbar for 5 minutes treatment time for ITO slides and glass slide.
3. Print the slides directly with 18° C. mix on warm slides (37° C.-40° C.) and leave them to dry for at least 1 hour up to a maximum of 48 h in a dark dissector.

Printing Mix Preparation

Immediately following Oxygen Plasma treatment, the printing solution comprising APTES, genetic material (siRNA or gRNA for example) and Fibronectin was prepared in the following proportions: 10.7% APTES, 60.7% genetic material, and 28% Fibronectin.

Slide Printing

Immediately following the Oxygen Plasma treatment, the printing solution was printed on the slides directly with 18° C. mix on warm slides (37° C.-40° C.) then Dried for at least 1 hour or maximum for 48 h in a dark dissector.

ITO Slide Preparation and siRNA Printing Optimisation

Figure 3:
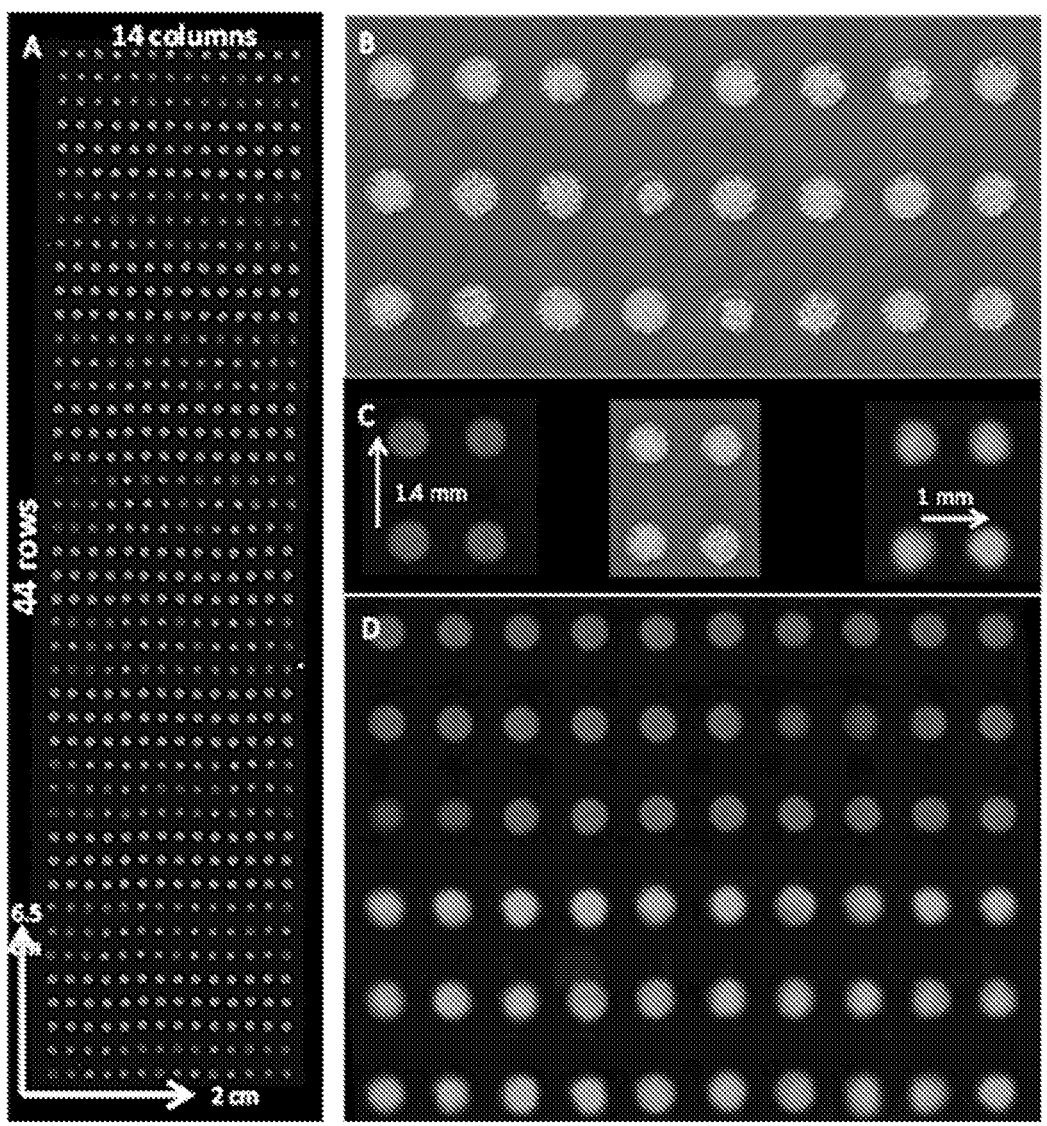
FIG. 3 is and image of an siRNA spotted ITO slide. The slide was spotted with two different non-coding siRNAs labelled with GFP or mCherry to check for immobilisation and cross-contamination. A) A stitched tiling scan image of the entire spotted slide showing an overlay of two channels; GFP and mCherry. B) A brightfield image of a section of the ITO spotted slide. C) An image of four spots from each channel showing the pitches sizes D) An image of a section of the ITO spotted slide showing an overlay of two channels; GFP and mCherry.

To check for spot immobilization and cross-contamination, the slides were washed, and plasma oxidized and then printed with two different non-coding siRNA controls (Sigma-Aldrich) labelled with Alexafluor 428 dye for the green channel and Alexafluor 648 for the red channel alternately in a total number of 616 spots (14 columns and 44 rows). The space between spots in each column was 1.4 mm. The slide was subsequently imaged using a Zeiss Axiovert 200 inverted widefield fluorescent microscope in Brightfeild, GFP, and mCherry channels to produce a tile scan (FIG. 3).

Results

It was found that the presence of the temperature gradient between the printing solution and the slides resulted in a very strong non-reversible precipitation of the particles. It is thought that "perfect sink conditions" were created that caused the particles of the printing solution to be irreversibly attached to the hard surface when they move into the PEM zone (FIG. 1). Without wishing to be bound by theory this may be explained by the fact that the attractive Van der Wals force in the PEM region was much stronger than that of the electric double layer. Thus, the particles were deposited on the solid surface. We were able to seed cells and conduct experiments, such as revers transfection, while preserving the fluorescent siRNA/gRNA signal for up to 7 days. The deposited particles of the printing solution and any seeded cells remained in situ for more than 12 days.

EXAMPLE 2

Modulation of Gene Expression with Stable siRNA in Stable Cell Lines

As a first step, the HTS-system was tested with 840 spots, where each spot was seeded with a human umbilical vein endothelial cell (HUVEC) stable cell line tagged with copGFP. This commercially available stable cell line was treated with siRNA directed against copGFP and the GFP-fluorescence signal per cell was used as a read-out for the effect of siRNA inhibition.

ITO Slides Preparation

The ITO slides were prepared as described in Example 1 in the previous section.

ITO Slides Printing

Immediately following Oxygen Plasma treatment, the ITO slides were printed with two different siRNAs. Either a non-coding siRNA (Sigma-Aldrich) labelled with red Alexafluor 648 dye as a control or a copGFP targeting siRNA (copGFP siRNA, Sigma, target sequences: CCCAAUGGGAGACAACGUU, AACGUUGUCUCC-CAUUGGG). The slides were then left in a dark dissector for two days to dry.

Cell Culture

Two days after printing the slides were seeded with passage 3 of copGFP-HUVEC at a density of 480,000 cells per slide. The cells adhered preferentially to the spots printed as described in Example 1 (FIGS. 4A, B and C).

Using cold and/or room temperature media and reagents, the cells were trypsinised and seeded directly on each slide in 600 µL of full serum media per slide without washing and incubated for 20 minutes. The slides were then washed with full serum media so that excess cells were removed. Cellular plasma or nuclear dyes were added to the slide one hour after attachment.

Imaging and Data Analysis

Figure 4:
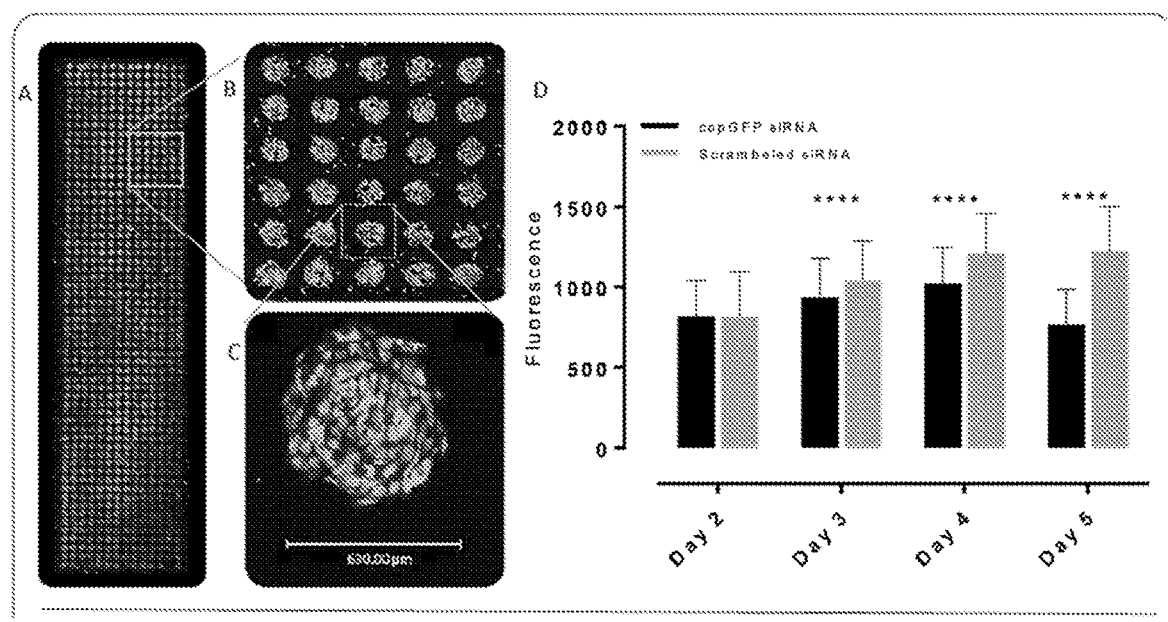
FIG. 4 is a tile scan image of a 5× reverse transfection experiment whereby 840 siRNA spots were printed on ITO slides seeded with GFP-HUVEC, subjected to reverse transfection using electroporation and then imaged from the second to the fifth day after transfection using Zeiss Axiovert 200 inverted widefield fluorescent microscope in GFP channel.

The slides were imaged from the second to the fifth day using a Zeiss Axiovert 200 inverted widefield fluorescent microscope (FIG. 4D). The fluorescence of ~100 cells per spot was determined and the average calculated. Subsequent analysis was carried out using a mixed model (SPSS, n=4, 840 spots per experiment). The results revealed a 58% knockdown on the fifth day (FIG. 4D, $p<0.05$).

EXAMPLE 3

Modulation of Gene Expression with CRISPR-Cas9

Despite wide usage, RNAi has two major drawbacks. Firstly, the transient nature of the inhibition by RNAi allows only temporary knockdown of gene expression. Secondly, off-target effects have been reported. Consequently, we decided to evaluate the clustered, regularly interspaced, short palindromic repeat associated (CRISPR-Cas9) genome editing system using our platform. CRISPR-Cas9 is more versatile than RNAi as it can be used to induce InDels to both repress or activate gene expression and cause both heritable and non-heritable genomic changes. For these experiments we used fibroblasts isolated from lungs of CRISPR-Cas9+/+knock-in mice obtained from the Jacksons laboratories (stock: 024858) which constitutively express CRISPR-Cas9 endonuclease and EGFP in all cells in combination with in vitro transcribed (IVT) transfection-ready RNA-guided endonucleases (RGENs) or (gRNA) based on CRISPR-Cas9 (ThermoFisher).

Slides Preparation

The slides were prepared as described in Example 1 in a previous section.

Slide Printing

Immediately following Oxygen Plasma treatment the ITO slides were printed with two different synthetic gRNAs. One a non-coding gRNA (GGTAGTAATCGCGAACTGCC) un-labelled as a control and the second a mix of 4 gRNAs targeting the Purinergic Receptor P2X Ligand-Gated Ion Channel 7 gene (P2Rx7) in 4 different locations (gRNA sequences: TGAGCGATAAGCTGTACCAG, CGGATCCAGAGCACGAATTA, CGGTGCCATAAT-TCGTGCTC, CGAATTATGGCACCGTCAAG). Two different gRNA concentrations were used (5× and 20× compared to the siRNA used in previous experiments based on previous optimization). The slides where left in a dark dissector for two days to dry.

Cell Culture

Two days after printing the slides were seeded with Cas9+ fibroblasts at passage 6 at a density of 480,000 cells per slide.

RNA Extraction and qPCR

Figure 5:
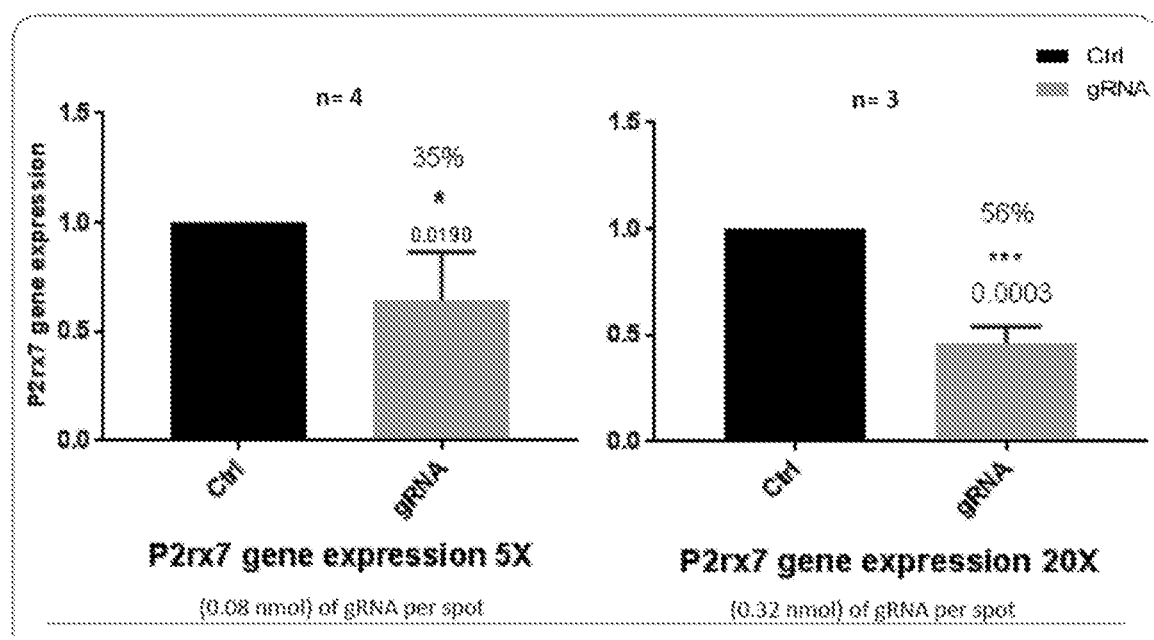
FIG. 5 are graphs that show the percentage inhibition of P2rx7 12 days after gRNA that has been printed onto ITO slides using the developed method is reverse transfected into cells. The graphs show the percentage inhibition when two different concentrations of gRNA are used in the spot.

The slides were kept for 12 days after which time RNA was extracted and cDNA synthesized. Quantitative PCR using TaqMan master mix and props (P2rX7 Mm00440578_m1) was performed to measure gene expression of P2Rx7. The data was analysed and normalised to two housekeeping genes. A 35% knockdown of target P2Rx7 gene was observed when 0.08 nmol/spot gRNA was printed as part of each spot (FIG. 5). A 56% knockdown of the target P2Rx7 gene was observed when 0.32 nmol/spot gRNA was printed as part of each spot (FIG. 5).

EXAMPLE 4

Modulation of Gene Expression with gRNA in Stable CRISPR-Cas9 Cell Lines
CRISPR SpCas9-HF Cas9 Stable HEK293 Cell Line In this experiment the CRISPR SpCas9-HF Cas9 stable HEK293 cell line (SL553; GeneCopoeia, Inc., Rockville, Md.) was reverse transfected with fluorescently labelled gRNA targeting copGFP. The slide was printed alternately with control non-targeting gRNA and copGFP targeting gRNA on 840 spots. The spots were subsequently seeded with Cas9 copGFP HEK293 cells. This commercially available, stable cell line was treated with gRNA directed towards copGFP and the GFP-fluorescence signal per cell measured and used as a read-out for gRNA inhibition.

ITO Slides Preparation

The slides were prepared as described in Example 1 in a previous section.

ITO Slides Printing

Immediately following Oxygen Plasma treatment, the ITO slides were printed with two different gRNAs. One a non-coding gRNA (Thermofisher) as a control and the second a copGFP targeting gRNA. Slides were subsequently stored in a dark dissector for one day to dry. 2 piece TrueGuide Synthetic crRNA and Alt-Re CRISPR-Cas9 tracrRNA-ATTO™550 (read) was used to measure transfection efficiency.

Cell Culture

One day following printing, the slides were seeded with passage 2 CRISPR SpCas9-HF Cas9 stable HEK293 cell line (SL553; GeneCopoeia, Inc., Rockville, Md.) at a density of 500,000 cells per slide. The cells adhered preferentially to the spots printed as described in Example 1. Using cold and/or room temperature media and reagents, the cells were trypsinised and seeded directly on each slide in 600 µL of full serum media per slide without washing and incubated for 20 minutes. The slides were then washed with full serum media so that excess cells were removed. Cellular plasma and/or nuclear dyes were added to the slide one hour after attachment.

Imaging and Data Analysis

Slides were imaged on day 1 after transfection in order to measure gRNA transfection efficiency. Day 1 was chosen as the optimal time point as the optimal Cy3 signal intensity occurs at 24 hours using the IN Cell Analyzer 6000 Cell Imaging System. The cellular fluorescence of each cell in each spot was measured and analysed to determine the average fluorescence per cell using an image analysis platform.

Results

Figure 6:
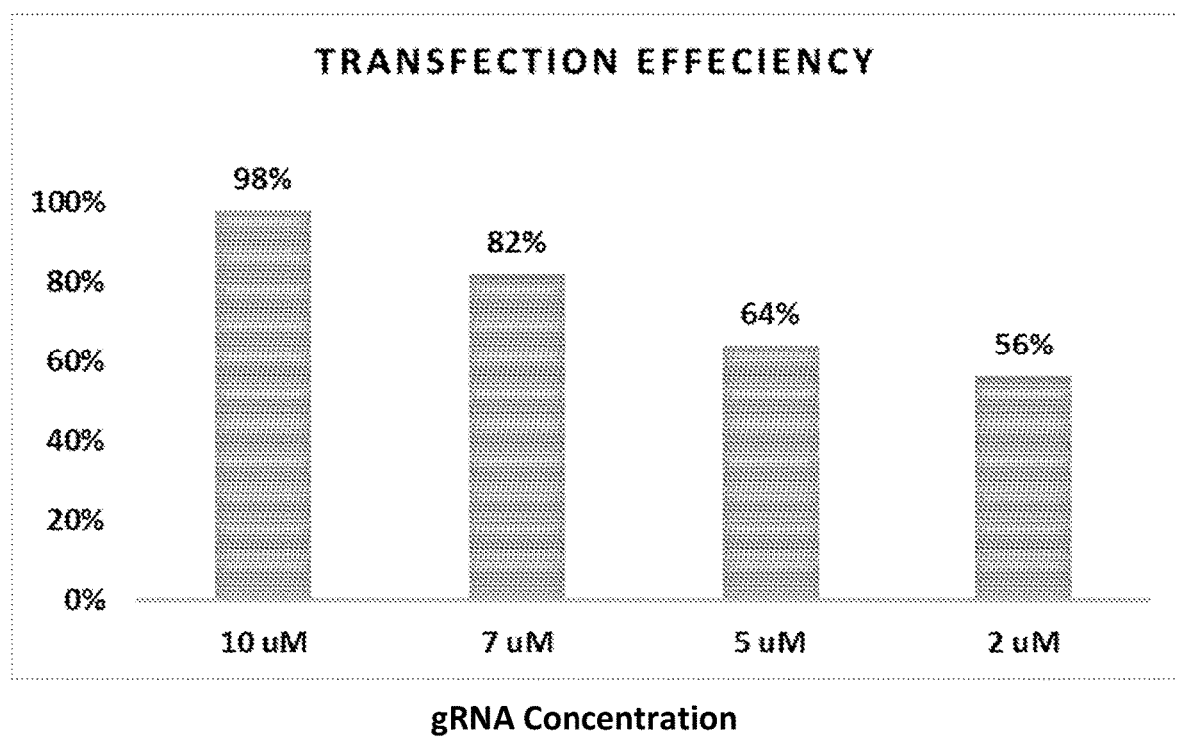
FIG. 6 is a graph that shows the transfection efficiency achieved after 24 hours. gRNA was printed onto ITO slides using the described protocol at a range of concentrations. The transfection efficiency was assessed as a percentage of cells expressing fluorescence which indicated that the gRNA had entered the cell.
Figure 7:
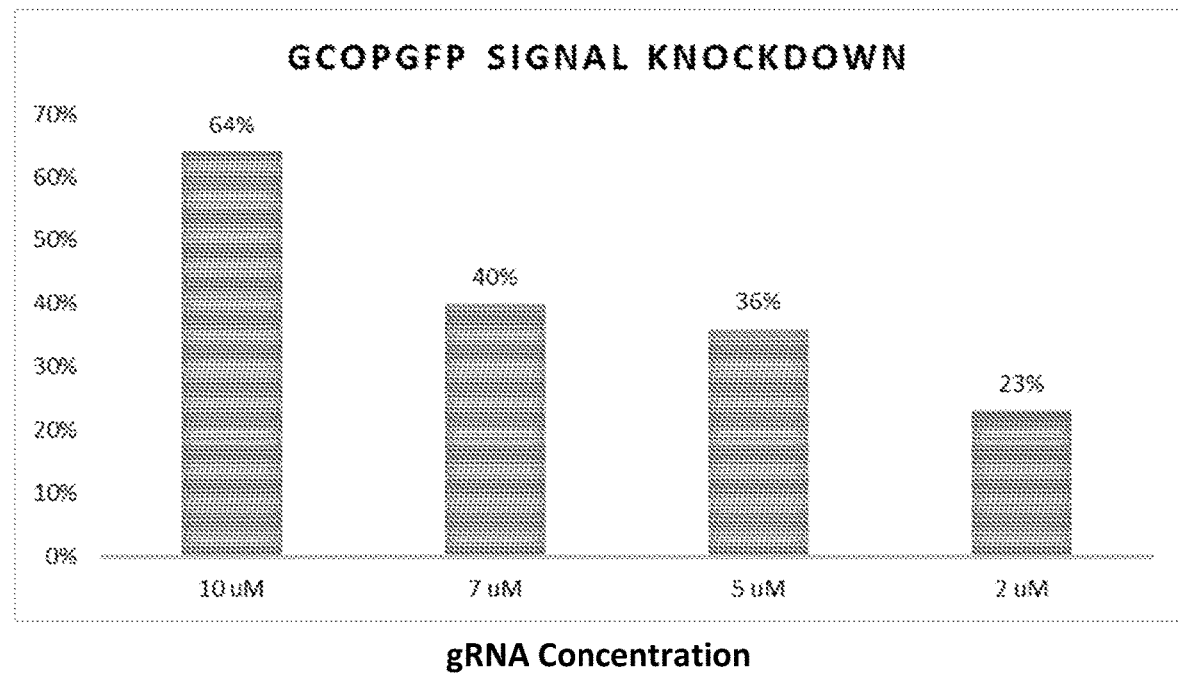
FIG. 7 is a graph that describes the copGFP signal knockdown as a result of transfection with gRNA targeting copGFP. Different spots were printed using a range of copGFP targeting gRNA concentrations. As the gRNA concentration used to print each spot was reduced so too was the copGFP signal knockdown.
Figure 8:
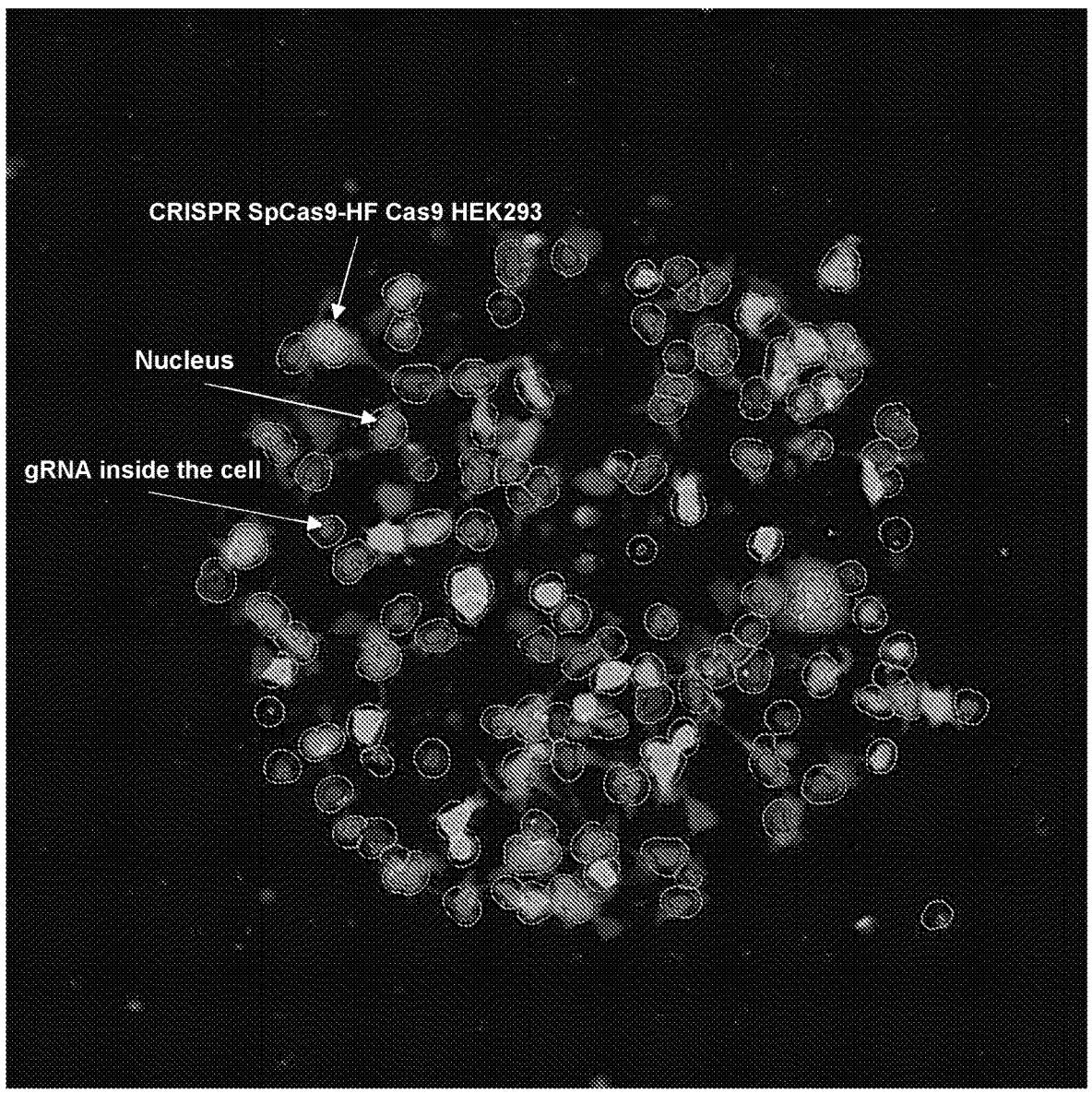
FIG. 8 is a representative image of a single spot on a slide seeded with CRISPR SpCas9-HF Cas9 stable HEK293 cells which have been subsequently transfected with gRNA targeting copGFP. The cells that have reduced fluorescence also contain gRNA. This indicates that the gRNA has successfully been reverse transfected into the cell and caused a knockdown in copGFP expression.

Using the protocol described above a transfection efficiency of 98% after 24 h was achieved (FIG. 6) when slides were printed with 10 µM gRNA. As expected, the reduction in transfection efficiency mirrors the reduction in the gRNA concentration with which each slide is prepared.

Following 3 days incubation post transfection the fluorescence of each cell was analysed using the IN Cell Analyzer 6000 Cell Imaging System to measure copGFP signal change. A reduction in fluorescence indicates that the copGFP transcript has been knocked down and the gRNA transfection was successful.

EXAMPLE 5

Modulation of Gene Expression with esiRNA and Mechanotransduction

Utilising the successful knockdown of specific genes within stable cell lines by reverse transfection of iRNA, we evaluated the method as described in previous examples as a tool to study endogenous mechanosensitive transcription factor using a system incorporating medium flow. For these experiments HUVEC primary cells in combination with KLF4 esiRNA were used as an intervention and KLF4 SmartFlares gold nanoparticles RNA Detection Probes as a readout.

Slide Preparation

The slides were prepared as described in Example 1 in a previous section

ITO Slide Printing

Immediately following Oxygen Plasma treatment, the ITO slides were printed with two different esiRNAs, a non-coding siRNA (Sigma-Aldrich) un-labelled as a control and a KLF4 targeting esiRNA. The method of printing is described in more detail in previous examples.

Cell Culture

Two days following printing the slides were seeded with HUVEC primary cells (primary HUVEC cells were isolated from the vein of the umbilical cord from a single donor and used at passage 4) at a density of 480,000 cells per slide.

KLF4 SmartFlares

SmartFlares gold nanoparticles were used as a readout. 300 μg per slide of each probe (KLF4 Hu-Cy3 Probe (SF-918) and an Uptake-Cy5 Probe (SF-137) as a positive control) was used. After cell seeding the SmartFlares were added to the slides and incubated for 24 hours before beginning the medium flow.

Flow Activation, Time-Lapse Imaging and Imaging Analysis

Figure 9:
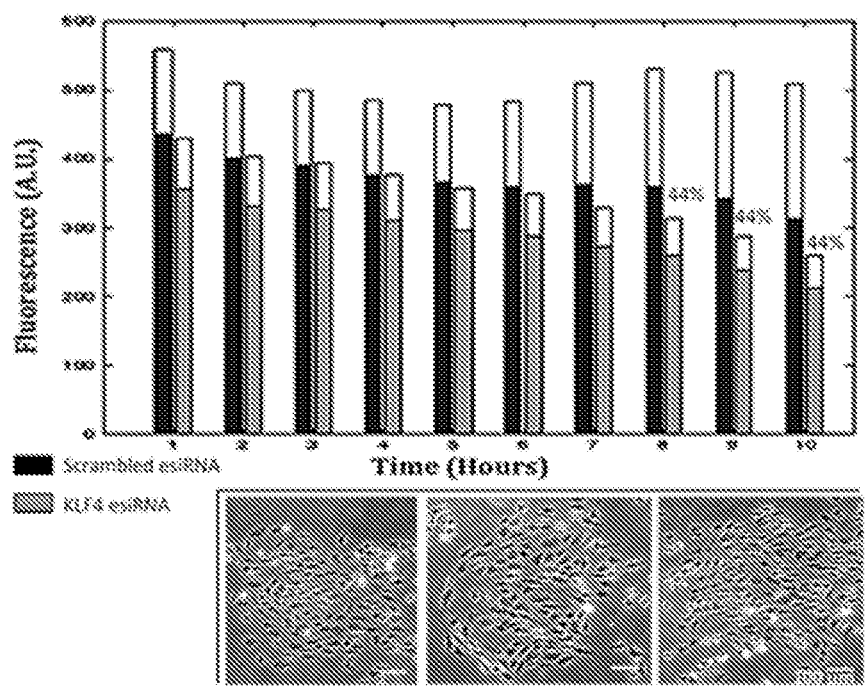
FIG. 9 is a graph that shows the expression knockdown of the target gene compared to a negative control observed after 8 hours of being subjected to medium flow. After 8 hours a knockdown of 44% was observed. This was carried out using time-lapse microscopy using a Zeiss Axiovert 200 inverted widefield fluorescent microscope in Cy3 and Cy5 channels. The lower section of the figure are three images of representative spots seeded with HUVEC cells. Minimal cell loss is observed (less than 10%) and the cells align with the direction of medium flow.

During the 10 hours following the implementation of medium flow the HUVEC cells were constantly monitored with an HT-microscope (Zeiss Axiovert 200 inverted widefield fluorescent microscope in Cy3 and Cy5 channels, n=840 spots). Images were captured once per hour which provided a total of 8400 images. Each cell was analysed individually and the fluorescence averaged per spot and per slide. A statistical analysis was performed and a 44% knockdown of KLF4 expression from the $8^{th}$ hour was observed (FIG. 9) with minimal cell loss. These results show that the method of slide preparation and printing of genetic material as described in this example is suitable for the study of mechanotransduction signalling pathways requiring medium flow. Indeed these methods may be suitable for a wide range of assays where medium flow is required to either illicit a cellular response or maintain the viability and/or in vivo like nature of the cells when cultured in vitro.

Although a few preferred embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A method of preparing a surface for deposition of cells, the method comprising the steps of:
   a) providing a biological material composition having a temperature of from 15 to 25° C.;
   b) providing the surface having a temperature of from 30 to 50° C.; and
   c) depositing the biological material composition having a temperature of from 15 to 25° C. onto the surface having a temperature of from 26 to 50° C., to at least partially adhere the biological material composition to the surface,
   wherein the difference in temperature of the biological material composition and the surface in step c) is at least 10° C.

2. The method according to claim 1, comprising, after step c), a step d) of drying the surface.

3. The method according to claim 1, wherein the surface is formed from glass.

4. The method according to claim 1, wherein the biological material composition comprises a nucleic acid.

5. The method according to claim 4, wherein the biological material composition comprises guide RNA suitable for CRISPR-Cas9 genome editing.

6. The method of claim 4, wherein the nucleic acid is small interfering RNA or guide RNA (gRNA).

7. The method according to claim 1, wherein the biological material composition comprises fibronectin.

8. The method according to claim 1, wherein the biological material composition comprises (3-aminopropyl)triethoxysilane.

9. The method according to claim 1, wherein step c) involves depositing the biological material composition to form a dot of the biological material composition on the surface.

10. The method according to claim 9, wherein step c) involves depositing the biological material composition multiple times to form an array of dots of the biological material composition on the surface.

11. The method of claim 1, wherein the surface is formed from indium tin oxide.

* * * * *